United States Patent
Frey et al.

(10) Patent No.: US 9,479,391 B2
(45) Date of Patent: Oct. 25, 2016

(54) IMPLEMENTING A SWITCH FABRIC RESPONSIVE TO AN UNAVAILABLE PATH

(75) Inventors: Michael G. Frey, Granite Bay, CA (US); Vincent E. Cavanna, Loomis, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 98 days.

(21) Appl. No.: 14/239,837

(22) PCT Filed: Sep. 28, 2011

(86) PCT No.: PCT/US2011/053705
§ 371 (c)(1),
(2), (4) Date: Feb. 20, 2014

(87) PCT Pub. No.: WO2013/048391
PCT Pub. Date: Apr. 4, 2013

(65) Prior Publication Data
US 2014/0211609 A1 Jul. 31, 2014

(51) Int. Cl.
H04L 12/703 (2013.01)
H04L 12/24 (2006.01)
H04L 12/933 (2013.01)
H04L 12/947 (2013.01)
(Continued)

(52) U.S. Cl.
CPC ....... *H04L 41/0663* (2013.01); *H04L 12/1881* (2013.01); *H04L 45/22* (2013.01); *H04L 49/101* (2013.01); *H04L 49/109* (2013.01); *H04L 49/25* (2013.01)

(58) Field of Classification Search
CPC ........ H04L 45/28; H04L 49/25; H04L 12/56
See application file for complete search history.

(56) References Cited

U.S. PATENT DOCUMENTS

| 6,532,212 | B1 | 3/2003 | Soloway et al. |
| 6,728,777 | B1 | 4/2004 | Lee et al. |
| 7,164,652 | B2 | 1/2007 | Puppa et al. |

(Continued)

FOREIGN PATENT DOCUMENTS

| CN | 1482769 A | 3/2004 |
| CN | 101047538 A | 10/2007 |
| CN | 101631080 A | 1/2010 |

OTHER PUBLICATIONS

International Search Report and Written Opinion, Apr. 13, 2012, PCT Application No. PCT/US2011/053705.

(Continued)

*Primary Examiner* — Fan Ng
(74) *Attorney, Agent, or Firm* — Mannava & Kang, P.C.

(57) ABSTRACT

In a method for implementing a switch fabric, in a first fabric chip, a packet comprising an identification of a destination node chip is received from a source fabric chip, and a determination that a first path in the switch fabric along which the packet is to be communicated toward the destination node chip is unavailable is made. In addition, a determination as to whether another path along which the packet is to be communicated toward the destination node chip that does not include the source fabric chip is available is made. In response to a determination that the another path is available, the packet is communicated along the another path. In addition, in response to a determination that the another path is unavailable, the packet is communicated back to the source fabric chip.

10 Claims, 7 Drawing Sheets

(51) Int. Cl.
*H04L 12/18* (2006.01)
*H04L 12/707* (2013.01)

(56) References Cited

U.S. PATENT DOCUMENTS

| | | | |
|---|---|---|---|
| 7,167,441 B2* | 1/2007 | Donoghue et al. | 370/216 |
| 7,403,484 B2 | 7/2008 | Goodfellow et al. | |
| 7,428,209 B1 | 9/2008 | Roberts | |
| 7,430,164 B2 | 9/2008 | Bare | |
| 7,680,107 B2 | 3/2010 | Kalkunte | |
| 2002/0051445 A1* | 5/2002 | Drottar et al. | 370/362 |
| 2002/0133756 A1 | 9/2002 | Jain | |
| 2002/0159468 A1* | 10/2002 | Foster et al. | 370/419 |
| 2003/0016624 A1* | 1/2003 | Bare | 370/217 |
| 2004/0213148 A1 | 10/2004 | Willhite et al. | |

OTHER PUBLICATIONS

Lakshminarayanan, K., et al., Achieving Convergence-Free Routing using Failure-Carrying Packets, University of California; University of Washington, < http://portal.acm.org/citation.cfm?id=1282380.1282408 > Publication Date: Aug. 27-31, 2007; On pp. 241-252.
Office Action, CN Application No. 201180073139.3, Date: Mar. 2, 2016, pp. 1-11.

* cited by examiner

IMPLEMENTING A SWITCH FABRIC RESPONSIVE TO AN UNAVAILABLE PATH

CROSS-REFERENCE TO RELATED APPLICATION

This application is a U.S. National Stage Application of and claims priority to International Patent Application No. PCT/US2011/053705, filed on Sep. 28, 2011, and entitled "IMPLEMENTING A SWITCH FABRIC RESPONSIVE TO AN UNAVAILABLE PATH".

BACKGROUND

Computer performance has increased and continues to increase at a very fast rate. Along with the increased computer performance, the bandwidth capabilities of the networks that connect the computers together has and continues to also increase significantly. Ethernet-based technology is an example of a type of network that has been modified and improved to provide sufficient bandwidth to the networked computers. Ethernet-based technologies typically employ network switches, which are hardware-based devices that control the flow of data packets based upon destination address information contained in the data packets. In a switched fabric, network switches connect with each other through a fabric, which allows for the building of network switches with scalable port densities. The fabric typically receives data from the network switches and forwards the data to other connected network switches.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
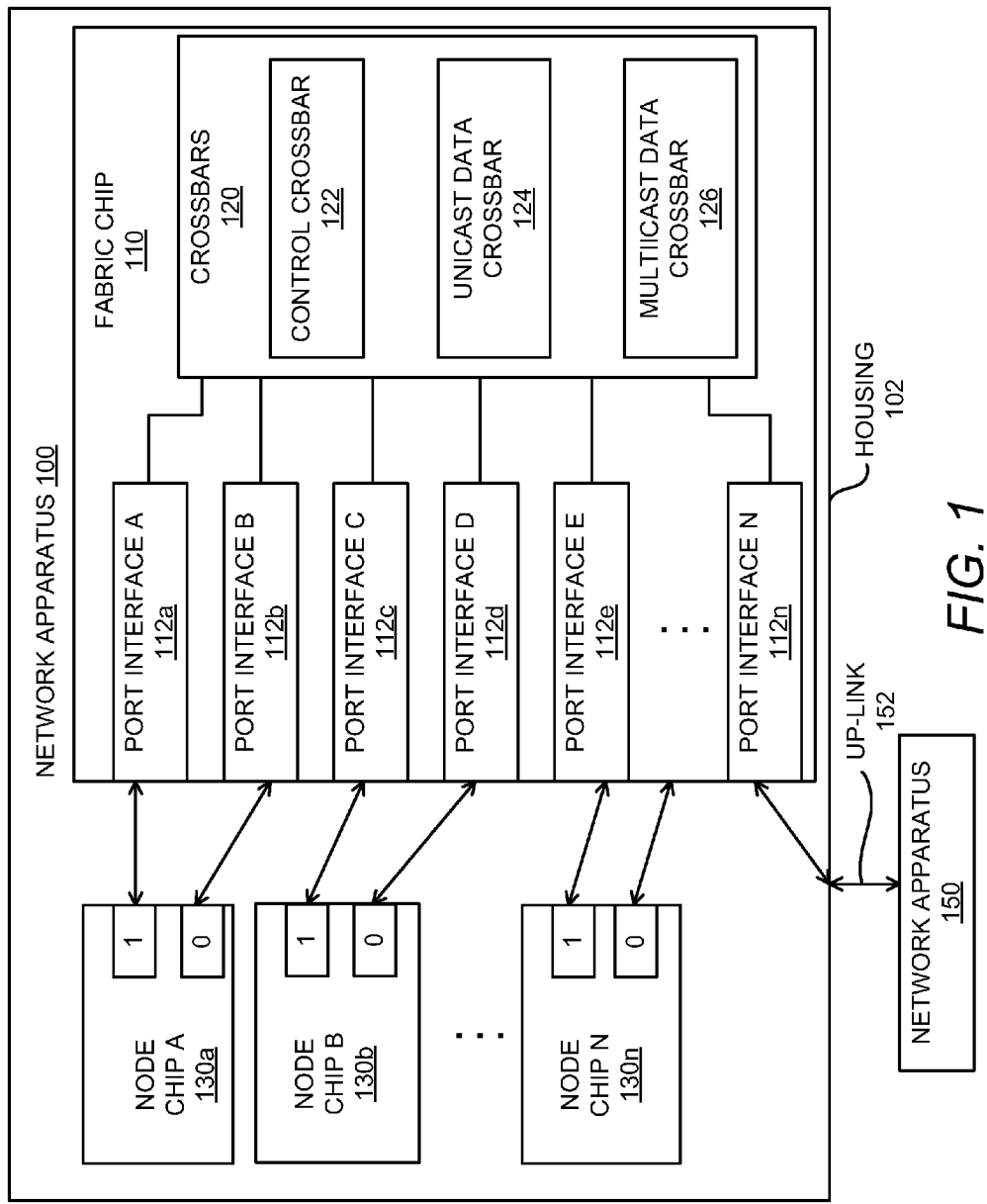
FIG. 1 illustrates a simplified schematic diagram of a network apparatus, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the term "n" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a fabric chip, a switch fabric comprising the fabric chip, and a method for implementing the switch fabric. The fabric chip disclosed herein is to avoid communicating a packet received from a source fabric chip back to the source fabric chip unless there are no other available paths in the switch fabric for the packet to traverse to reach a destination node chip. In other words, the fabric chip, switch fabric, and method for implementing the switch fabric disclosed herein substantially avoid bad "U-Turns" in the switch fabric. The source fabric chip may be defined herein as a fabric chip that is directly connected to and thus adjacent to another fabric chip. In this regard, the source fabric chip may be defined herein as the fabric chip through which a packet entered the switch fabric. In addition or alternatively, the source fabric chip may be defined as the previous fabric chip that a packet traversed prior to entering another fabric chip.

A "U-Turn" may be defined as a packet that is being sent back to the source fabric chip from which the packet was received by another fabric chip. The packet may be sent back through the same fabric port through which the packet arrived or through a different fabric port that is part of the same trunk as the fabric port through which the packet arrived. In any event, through implementation of the fabric chip, switch fabric, and method disclosed herein, the packet will only make a U-Turn as a last resort. That is, the packet will only be returned to the source fabric chip if there are no other paths or up-links that do not end up at the source fabric chip.

In addition, once the packet is communicated back to the source fabric chip, the source fabric chip selects a different fabric chip to which the packet is communicated to thereby continue propagation of the packet toward the destination node chip along a backward path. In this regard, the source fabric chip may treat trunked links with the fabric chip as a single link and may therefore prevent the packet from being communicated back to the fabric chip over a different trunked link. As such, wherein the highest priority fail-over option may be within the same trunk, that priority may be demoted to the lowest priority so that forward progress may continue to be made in the reverse direction in the switch fabric, once it has been decided that the packet is to be transmitted in the reverse direction. The reverse direction may be defined herein as a direction defined by starting at the fabric port that the packet is to use to egress from a fabric chip and directed to the fabric port that the packed was forced through. In other words, the reverse direction may comprise a direction that is not a preferred path for the packet.

Through implementation of the fabric chip, switch fabric, and method disclosed herein, a packet may continue to make progress through a switch fabric when the preferred path is unavailable or otherwise inactive. In addition, processes involving trunked links are incorporated into the implementation of the switch fabric to therefore avoid situations in which a packet is bounced back and forth between a source fabric chip and another fabric chip over a single link or over multiple trunked links.

As recited herein, trunked links between network switches or fabric chips in a switch fabric may be defined as two or more fabric links that join the same pair of network switches or fabric chips in the switch fabric. In other words, trunked links comprise parallel links. In addition, a trunk may be defined as the collection of trunked links between the same pair of network switches or fabric chips. Thus, for instance, a first trunk of trunked links may be provided between a first network switch and a second network switch, and a second trunk of trunked links may be provided between the first network switch and a third network switch. Packets may be communicated between the network switches over any of the trunked links joining the network switches.

As used herein, packets may comprise data packets and/or control packets. According to an example, packets comprise data and control mini-packets (MPackets), in which control mpackets are Requests or Replies and data mpackets are Unicast and/or Multicast.

With reference first to FIG. 1, there is shown a simplified diagram of a network apparatus 100, according to an example. It should be readily apparent that the diagram depicted in FIG. 1 represents a generalized illustration and that other components may be added or existing components may be removed, modified or rearranged without departing from a scope of the network apparatus 100.

The network apparatus 100 generally comprises an apparatus for performing networking functions, such as, a network switch, or equivalent apparatus. In this regard, the network apparatus 100 may comprise a housing or enclosure 102 and may be used as a networking component. In other words, for instance, the housing 102 may be for placement in an electronics rack or other networking environment, such as in a stacked configuration with other network apparatuses. In other examples, the network apparatus 100 may be inside of a larger ASIC or group of ASICs within a housing. In addition, or alternatively, the network apparatus 100 may provide a part of a fabric network inside of a single housing.

The network apparatus 100 is depicted as including a fabric chip 110 and a plurality of node chips 130a-130n having ports labeled "0" and "1". The fabric chip 110 is also depicted as including a plurality of port interfaces 112a-112n, which are communicatively coupled to respective ones of the ports "0" and "1" of the node chips 130a-130n. The port interfaces 112a-112n are also communicatively connected to a crossbar array 120, which is depicted as including a control crossbar 122, a unicast data crossbar 124, and a multicast data crossbar 126. The port interface 112n is also depicted as being connected to another network apparatus 150, which may include the same or similar configuration as the network apparatus 100. Thus, for instance, the another network apparatus 150 may include a plurality of node chips 130a-130n communicatively coupled to a fabric chip 110. As shown, the port interface 112n is connected to the another network apparatus 150 through an up-link 152. Alternatively, however, and as discussed in greater detail herein below, the network apparatus 100 and the another network apparatus 150 may communicate to each other through trunked links of a common trunk.

According to an example, the node chips 130a-130n comprise application specific integrated circuits (ASICs) that enable user-ports and the fabric chip 110 to interface each other. Although not shown, each of the node chips 130a-130n may also include a user-port through which data, such as, packets, may be inputted to and/or outputted from the node chips 130a-130n. In addition, each of the port interfaces 112a-112n may include a port through which a connection between a port in the node chip 130a and the port interface 112a may be established. The connections between the ports of the node chip 130a and the ports of the port interfaces 112a-112n may comprise any suitable connection to enable relatively high speed communication of data, such as, optical fibers or equivalents thereof.

According to an example, the fabric chip 110 comprises an ASIC that communicatively connects the node chips 130a-130n to each other. The fabric chip 110 may also comprise an ASIC that communicatively connects the fabric chip 110 to the fabric chip 110 of another network apparatus 150, in which, such connected fabric chips 110 may be construed as back-plane stackable fabric chips. The ports of the port interfaces 112a-112n that are communicatively coupled to the ports of the node chips 130a-130n are described herein as "down-link ports". In addition, the ports of the port interfaces 112a-112n that are communicatively coupled to the port interfaces 112a-112n of the fabric chip 110 in another network apparatus 150 are described herein as "up-link ports".

According to an example, packets enter the fabric chip 110 through a down-link port of a source node chip, which may comprise the same node chip as the destination node chip. The destination node chip may be any fabric chip port in the switch fabric, including the one to which the source node chip is attached. In addition, the packets include an identification of which node chip(s), such as a data-list, a destination node mask, etc., to which the packets are to be delivered by the fabric chip 110. In addition, each of the port interfaces 112a-112n may be assigned a bit and each of the port interfaces 112a-112n may perform a port resolution operation to determine which of the port interfaces 112a-112n is to receive the packets. More particularly, for instance, the port interfaces 112a through which the packet was received may apply a bit-mask to the identification of node chip(s) contained in the packet to determine the bit(s) identified in the data and to determine which of the port interface(s) 112b-112n correspond to the determined bit(s). In instances where the packet comprises a uni-cast packet, the port interface 112a may transfer the data over the appropriate crossbar 122-126 to the determined port interface(s) 112b-112n. However, when the packet comprises a multi-cast packet, the port interface 112a may perform additional operations during the port resolution operation to determine which of the port interfaces 112b-112n is/are to receive the multi-cast packet as discussed in greater detail herein below.

Figure 2:
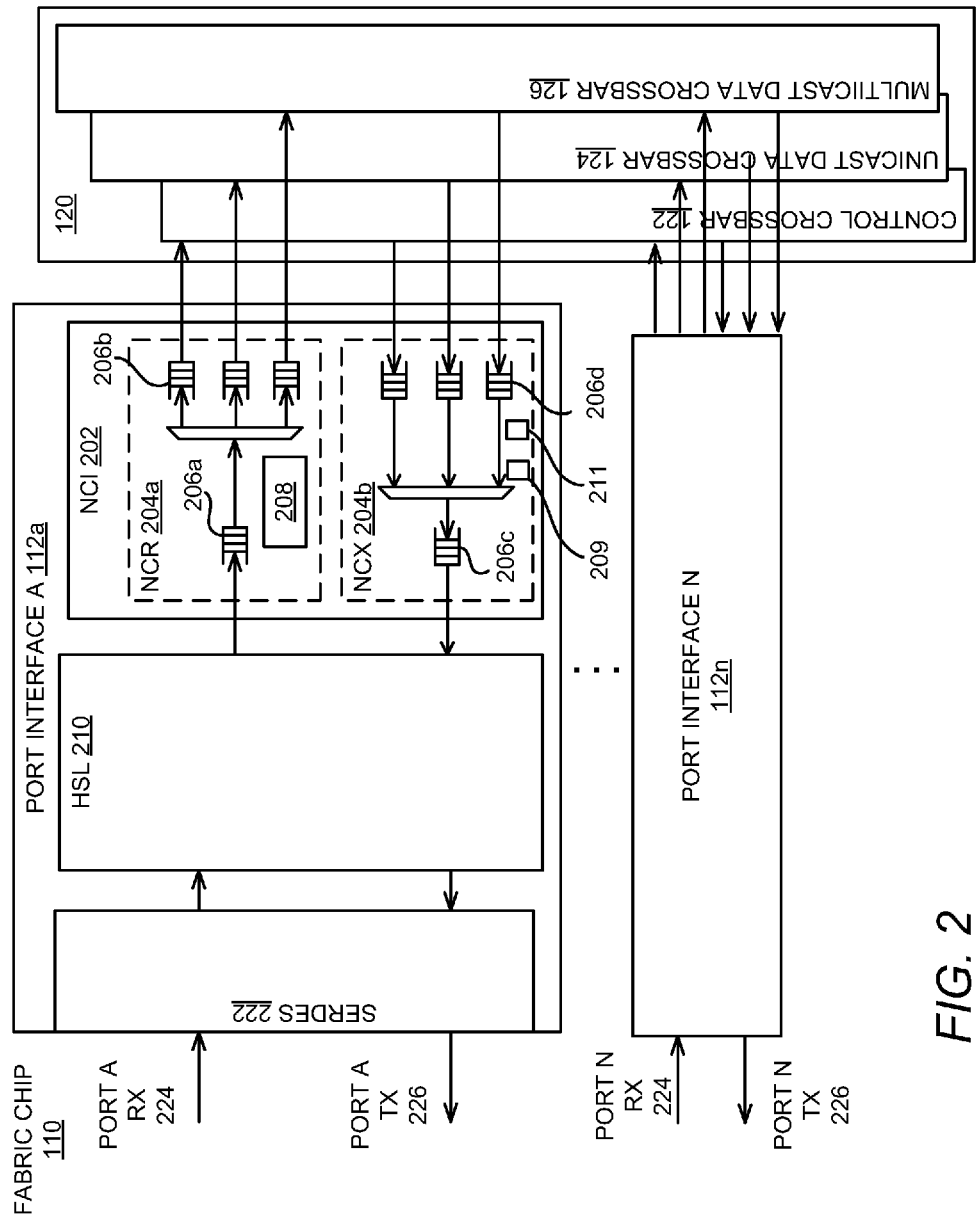
FIG. 2 shows a simplified block diagram of the fabric chip depicted in FIG. 1, according to an example of the present disclosure.

With particular reference now to FIG. 2, there is shown a simplified block diagram of the fabric chip 110 depicted in FIG. 1, according to an example. It should be apparent that the fabric chip 110 depicted in FIG. 2 represents a generalized illustration and that other components may be added or existing components may be removed, modified or rearranged without departing from a scope of the fabric chip 110.

The fabric chip 110 is depicted as including the plurality of port interfaces 112a-112n and the crossbar array 120. The components of a particular port interface 112a are depicted in detail herein, but it should be understood that the remaining port interfaces 112b-112n may include similar components and configurations.

As shown in FIG. 2, the fabric chip 110 includes a network chip interface (NCI) block 202, a high-speed link (HSL) (interface) block 210, and a set of serializers/deserializers (serdes) 222. By way of particular example, the set of serdes 222 includes a set of serdes modules. In addition, the serdes 222 is depicted as interfacing a receive port 224 and a transmit port 226. Alternatively, however, components other than the HSL block 210 and the serdes 222 may be employed in the fabric chip 110 without departing from a scope of the fabric chip 110 disclosed herein.

The NCI block 202 is depicted as including a network chip receiver (NCR) block 204a and a network chip transmitter (NCX) block 204b. The NCR block 204a feeds data received from the HSL block 210 to the crossbar array 120 and the NCX block 204b transfers data received from the crossbar array 120 to the HSL block 210. The NCR block 204a and the NCX block 204b are further depicted as comprising respective registers 206a-206d, in which some of the registers 206b and 206d are communicatively coupled to one of the crossbars 122-126 and others of the registers 206a and 206c are communicatively coupled to the HSL block 210.

The NCI block 202 generally transfers data and control mini-packets (MPackets) in full duplex fashion between the corresponding HSL block 210 and the crossbar array 120. In addition, the NCI 202 provides buffering in both directions. The NCI block 202 also includes a port resolution module 208 that interprets destination and path information contained in each received MPacket. By way of example, each received MPacket may include a destination-node-chip-mask that the port resolution module 208 may use in performing a port resolution operation to determine the correct destination NCI block 202 in a different port interface 112b-112n of the fabric chip 110, to make the next hop to the correct destination node chip 130a-130n, which may be attached to a down-link port or an up-link port of the fabric chip 110. In this regard, the port resolution module 208 may be programmed with a resource, bit-mask in which each bit corresponds to one of the port interfaces 112a-112n of the fabric chip 110. In addition, during the port resolution operation, the port resolution module 208 may use the bit-mask on the fabric-port-mask to determine which bits, and thus, which port interfaces 112b-112n, are to receive the packet. In addition, the port resolution module 208 interprets the destination and path information, determines the correct NCI block 202, and determines the ports to which the packet is to be outputted independently of external software. In other words, the port resolution module 208 need not be controlled by external software to perform these functions.

The port resolution module 208 may be programmed with machine-readable instructions that, when executed, cause the port resolution module 208 to determine that a first path in the switch fabric along which the packet is to be communicated toward the destination node is unavailable, to determine whether another path in the switch fabric along which the packet is to be communicated toward the destination node chip that does not include the source fabric chip is available, in response to a determination that the another path is available, to communicate the packet along the another path, and in response to a determination that the another path is unavailable, to communicate the packet back to the source fabric chip. In this regard the port resolution module 208 is only communicate the packet back to the source fabric chip if there are no other available paths for the packet to take to reach the destination node chip.

The port resolution module 208 may also be programmed with information that identifies which of the port interfaces 112a-112n comprise up-links that are trunked links. As discussed in greater detail herein below, the port resolution module 208 may treat all of the trunked links as a common link for purposes of avoiding returning the packet back to the source fabric chip unless there are no further paths available over which the packet is able to reach the destination node chip.

The NCX block 204b also includes a node pruning module 209 and a unicast conversion module 2011 that operates on packets received from the multicast data crossbar 126. More particularly, the unicast conversion module 211 is to process the packets to identify a data word in the data that the node-chip on the down-link will need for that packet. In addition, the node pruning module 209 is to prune a destination node chip mask to a subset of the bits that represent which node chips are to receive a packet such that only destination node chips 130a-130n that were supposed to traverse the port are still included in the chip mask. Thus, for instance, if the NCX block 204b receives a multi-cast packet listing a chip node 130a of the fabric chip 110 and a chip node 130 attached to another network apparatus 150, the NCX block 204b may prune the data-list of the multi-cast packet to remove the chip node 130a of the fabric chip 110 prior to the multi-cast packet being sent out to the another apparatus 150.

The HSL block 210 generally operates to initialize and detect errors on the hi-speed links, and, if necessary, to re-transmit data. According to an example, the data path between the NCI block 202 and the HSL block 210 is 64 bits wide in each direction.

Figure 3:
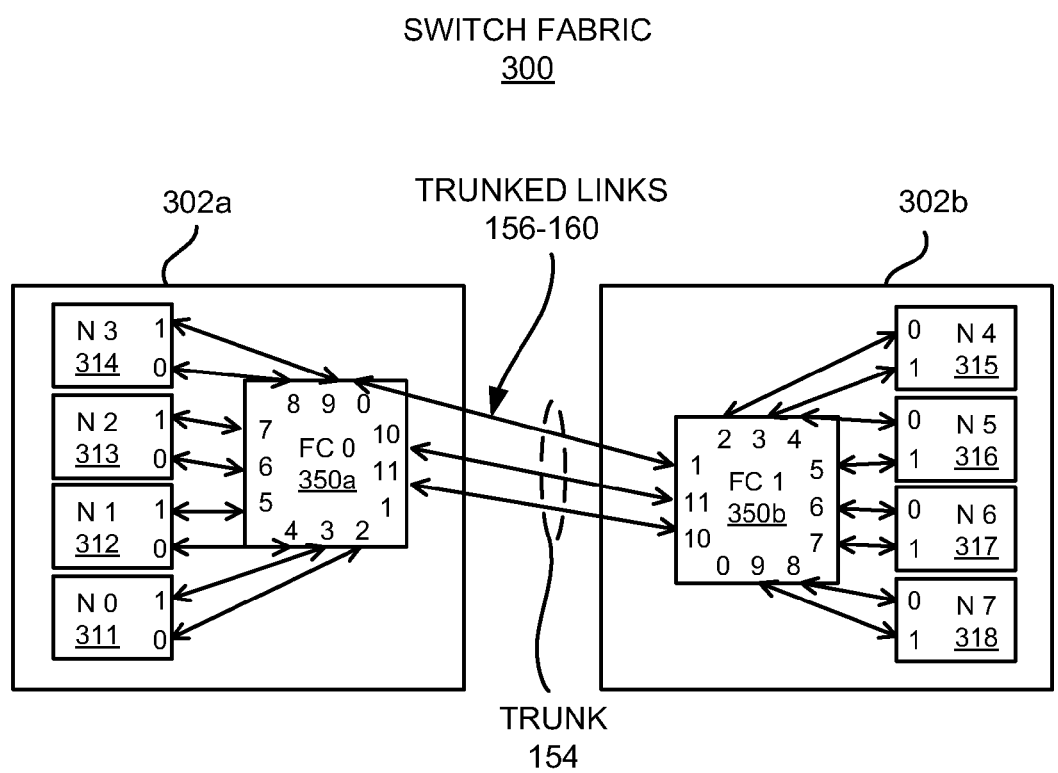
FIGS. 3, 4A, and 4B, respectively, show simplified block diagrams of switch fabrics, according to examples of the present disclosure.
Figure 4A:
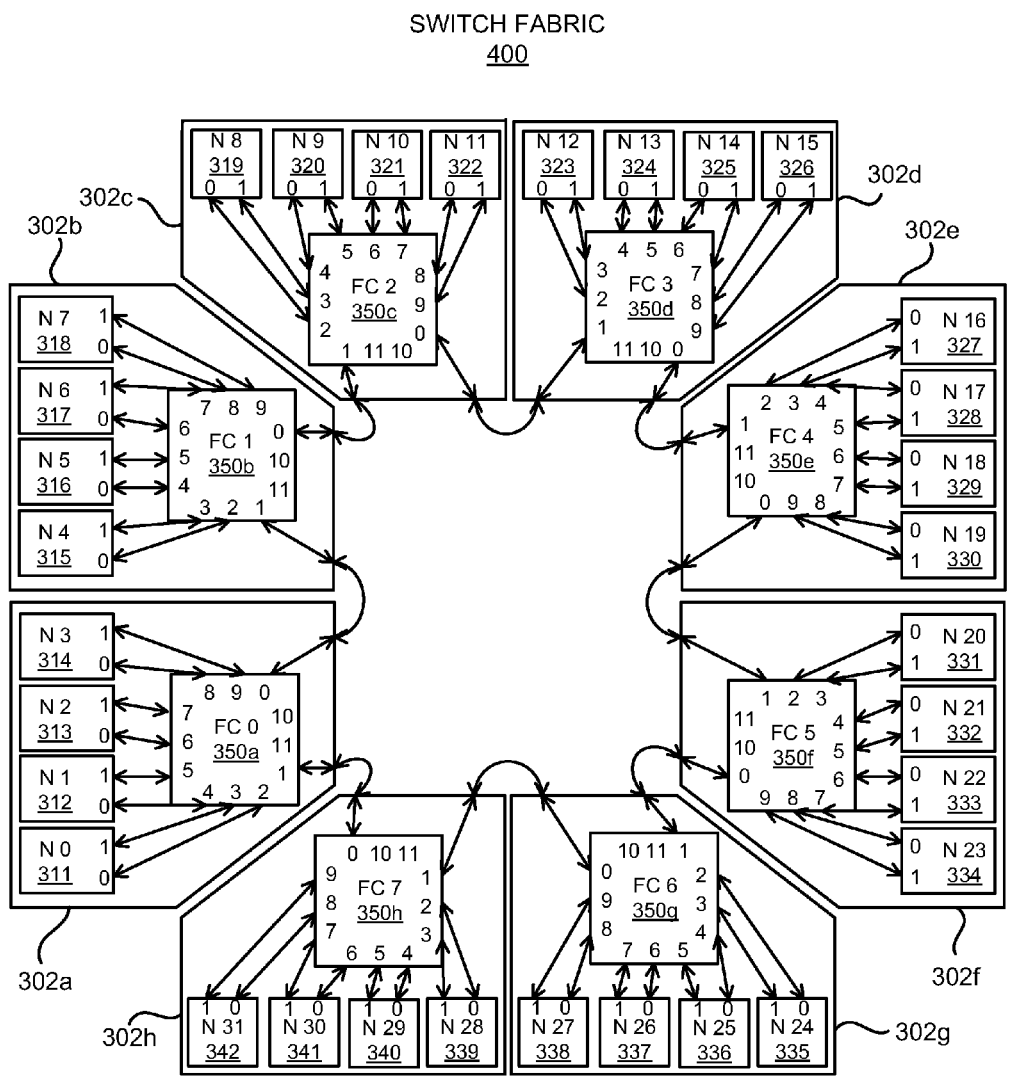
Figure 4B:
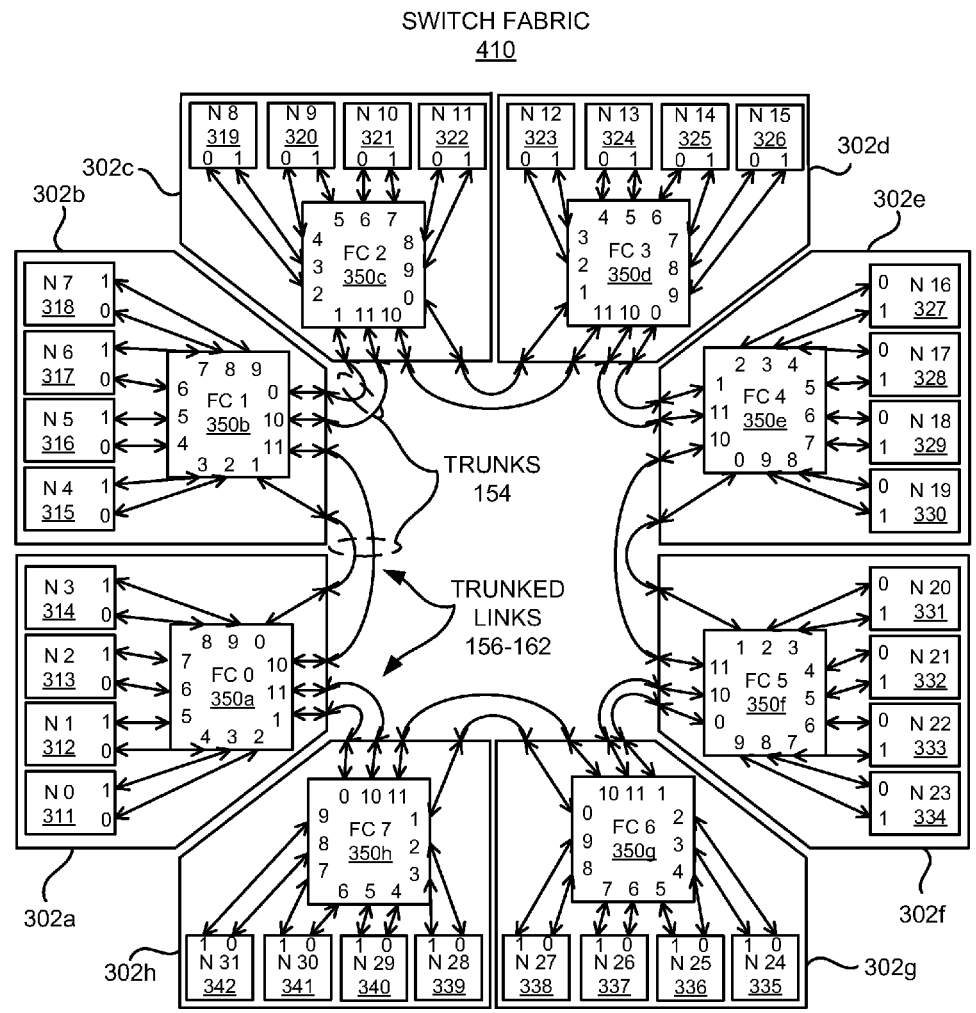

Turning now to FIGS. 3, 4A, and 4B, there are respectively shown simplified block diagrams of switch fabrics 300, 400, and 410, according to various examples. It should be apparent that the switch fabrics 300, 400, and 410 depicted in FIGS. 3, 4A, and 4B represent generalized illustrations and that other components may be added or existing components may be removed, modified or rearranged without departing from the scopes of the switch fabrics 300, 400, and 410.

The switch fabric 300 is depicted as including two network apparatuses 302a and 302b and the switch fabrics 400 and 410 are depicted as including eight network apparatuses 302a-302h. Each of the network apparatuses 302a-302h is also depicted as including a respective fabric chip (FC0-FC7) 350a-350h. Each of the network apparatuses 302a-302h may comprise the same or similar configuration as the network apparatus 100 depicted in FIG. 1. In addition, each of the fabric chips 350a-350h may comprise the same or similar configuration as the fabric chip 110 depicted in FIG. 2. Moreover, although particular numbers of network apparatuses 302a-302h have been depicted in FIGS. 3, 4A, and 4B, it should be understood that the switch fabrics 300, 400, and 410 may include any number of network apparatuses 302a-302h arranged in any number of different configurations with respect to each other without departing from scopes of the switch fabrics 300, 400, and 410.

In any regard, as shown in the switch fabrics 300, 400, and 410, the network apparatuses 302a-302h are each depicted as including four node chips (N0-N31) 311-342. Each of the node chips (N0-N31) 311-342 is depicted as including two ports (0, 1), which are communicatively coupled to a port (0-11) of at least one respective fabric chip 350a-350h. More particularly, each of the ports of the node chips 311-342 is depicted as being connected to one of twelve ports 0-11, in which each of the ports 0-11 is communicatively coupled to a port interface 112a-112n. In addition, the node chips 311-342 are depicted as being connected to respective fabric chips 350a-350h through bi-directional links. In this regard, data may flow in either direction between the node chips 311-342 and their respective fabric chips 350a-350h.

As discussed above with respect to FIG. 1, the ports of the fabric chips 350a-350h that are connected to the node chips 311-342 are termed "down-link ports" and the ports of the fabric chips 350a-350h that are connected to other fabric chips 350a-350h are termed "up-link ports". Each of the up-link ports and the down-link ports of the fabric chips 350a-350h includes an identification of the destination node chips 311-342 that are intended to be reached through that link. In addition, the packets supplied into the switch fabrics 300, 400, and 410 include with them an identification of the node chip(s) 311-342 to which the packets are to be delivered. The up-link ports whose identification of node chips 311-342 matches one or more node chips in the identification of the node chip(s), or chip mask, is considered to be a "preferred up-link port", which will receive the data to be transmitted, unless the "preferred up-link port" is dead or is otherwise unavailable. If a preferred up-link is dead or otherwise unavailable, the port resolution module 208 may use a programmable, prioritized list of port interfaces to select an alternate up-link port interface to receive the packet instead of the preferred up-link port.

The down-link ports whose list of a single node chip 311-342 matches one of the node chips in the identification of the node chip(s) are considered to be the "active down-link ports". A "path index" is embedded in the packet, which selects which of the "active down-link ports" will be used for the packet. This path-based filtering enables a fabric chip 350a-350h to have multiple connections to a node chip 311-342.

In any regard, the fabric chips 350a-350h are to deliver the packet to the node chip(s) 311-342 that are in the identification of the node chip(s). For those node chips 311-342 contained in the identification of the node chip(s) that are connected to down-link ports of a fabric chip 350a, the fabric chip 350a may deliver the packet directly to that node chip(s) 311-314. However, for the node chips 315-342 in the identification of the node chip(s) that are not connected to down-link ports of the fabric chip 350a, the fabric chip 350a performs hardware calculations to determine which up-link port(s) the packet will traverse in order to reach those node chips 315-342. These hardware calculations are defined as "port resolution operations".

As shown in FIG. 3, the fabric chip 350a of the network apparatus 302a is depicted as being communicatively connected to the fabric chip 350b of the network apparatus 302b through three trunked links 156-160, which are part of the same trunk 154. In FIG. 4A, each of the fabric chips 350a-350h is connected to exactly two other fabric chips 350a-350h. In FIG. 4B, each of the fabric chips 350a-350h is depicted as being connected to two neighboring fabric chips 350a-350h through two respective trunked links 156-158 and 160-162, which are part of two separate trunks 154.

The switch fabrics 400 and 410 depicted in FIGS. 4A and 4B comprise ring network configurations, in which each of the fabric chips 350a-350h is connected to exactly two other fabric chips 350a-350h. More particularly, ports (0) and (1) of adjacent fabric chips 350a-350h are depicted in FIG. 4A as being communicatively coupled to each other. In addition, ports (0) and (1) and (10) and (11) of adjacent fabric chips 350a-350h are depicted in FIG. 4B as being communicatively connected to each other. As such, a single continuous pathway for data signals to flow through each node is provided between the network apparatuses 302a-302h.

Although the switch fabric 300 has been depicted as including two network apparatuses 302a, 302b and the switch fabrics 400, 410 have been depicted as including eight network apparatuses 302a-302h, with each of the network apparatuses 302a-302h including four node chips 311-342, it should be clearly understood that the switch fabrics 300, 400, and 410 may include any reasonable number of network apparatuses 302a-302h with any reasonable number of links 152 and/or trunked links 156-162 between them without departing from the scopes of the switch fabrics 300, 400, and 410. In addition, the network apparatuses 302a-302h may each include any reasonably suitable number of node chips 311-342 without departing from the scopes of the switch fabrics 300, 400, and 410. Furthermore, each of the fabric chips 350a-350h may include any reasonably suitable number of port interfaces 112a-112n and ports. Still further, the network apparatuses 302a-302h may be arranged in other network configurations, such as, a mesh arrangement or other configuration.

Figure 5:
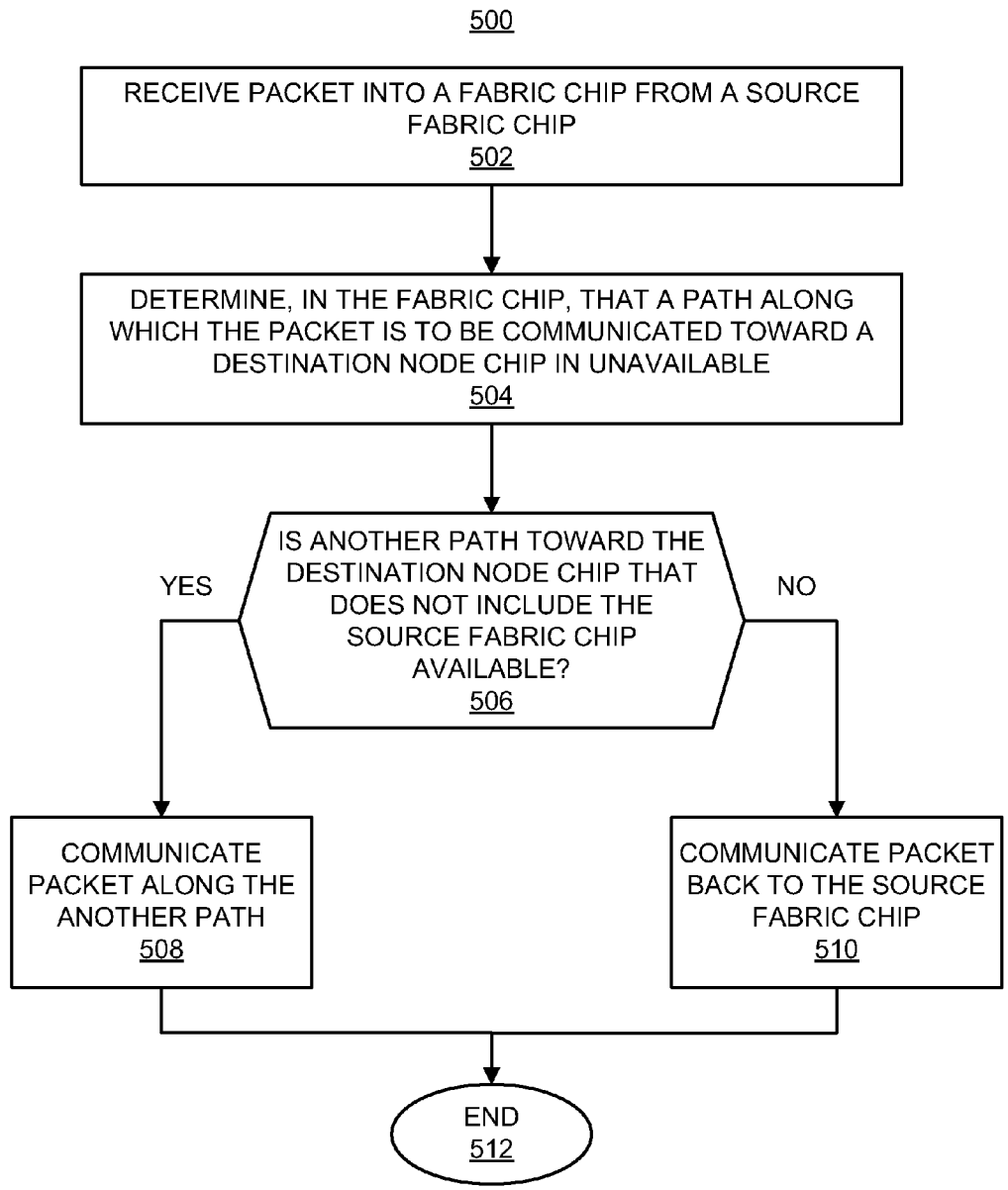
FIGS. 5 and 6, respectively, show flow diagrams of methods for implementing a switch fabric comprising a fabric chip of FIGS. 1-4B, according to an example of the present disclosure.
Figure 6:
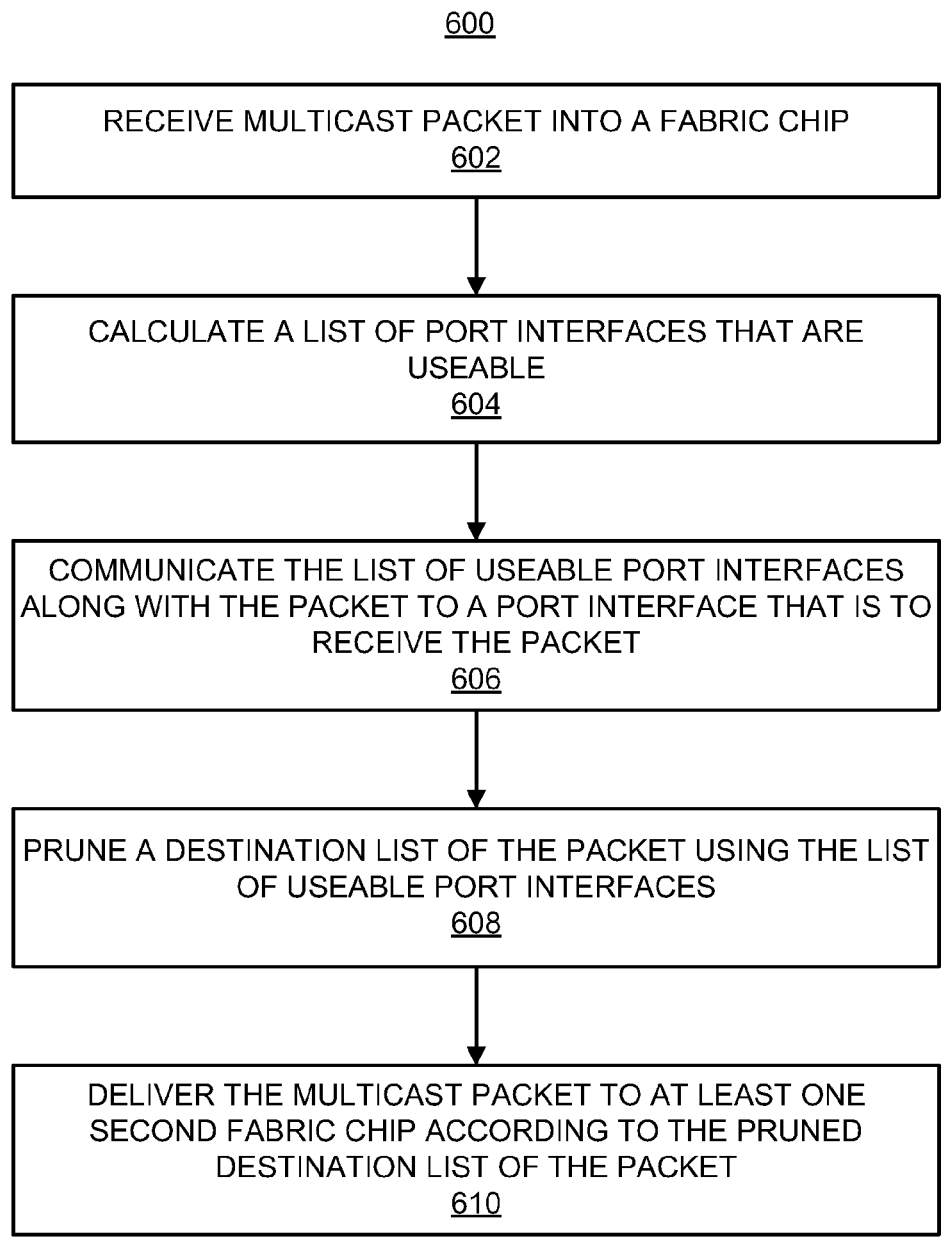

Various manners in which the switch fabrics 300, 400, and 410 may be implemented are described in greater detail with respect to FIGS. 5 and 6, which, respectively depict flow diagrams of methods 500 and 600 for implementing a switch fabric comprising fabric chips 110, 350a-350h, such as those depicted in FIGS. 1-4B, according to an example. It should be apparent that the methods 500 and 600 represent generalized illustrations and that other steps may be added or existing steps may be removed, modified or rearranged without departing from the scopes of the methods 500 and 600.

The descriptions of the methods 500 and 600 are made with particular reference to the fabric chips 110 and 350a-350h depicted in FIGS. 1-4B. It should, however, be understood that the methods 500 and 600 may be performed in fabric chip(s) that differ from the fabric chips 110 and 350a-350h without departing from the scopes of the methods 500 and 600. In addition, although reference is made to particular ones of the network apparatuses 302a-302h, and therefore particular ones of the fabric chips 350a-350h and the node chips 311-342, it should be understood that the operations described herein may be performed by and/or in any of the network apparatuses 302a-302h.

Each of the port interfaces 112a-112n of the fabric chips 110, 350a-350h may be programmed with the destination node chips 130a-130n, 311-342 that are to be reached through the respective port interfaces 112a-112n. Thus, for instance, the port interface 112a containing the port (2) of the fabric chip (FC0) 350a may be programmed with the node chip (N0) 311 as a reachable destination node chip for that port interface 112a. As another example, the port interface 112n containing the port (0) of the fabric chip (FC0) 350a may be programmed with the node chips (N4-N31) 315-342 or a subset of these node chips as the reachable destination node chips for that port interface 112n.

Each of the port interfaces 112a-112n of the fabric chips 110, 350a-350h may be programmed with identifications of which fabric links comprise trunked links. In addition, each of the port interfaces 112a-112n of the fabric chips 110, 350a-350h may be programmed with identifications of which trunked links are grouped together. Thus, for instance, the port interfaces 112a-112n of the fabric chip 350a may be programmed with information that the trunked links 156 and 158 are in a first trunk and that the trunked links 158 and 160 are in a second trunk.

Generally speaking, the method 500 depicted in FIG. 5 pertains to various operations performed by the fabric chips 350a-350h in response to receipt of a uni-cast or a multi-cast packet. In addition, the method 600 depicted in FIG. 6 pertains to various operations performed by the fabric chips 350a-350h in response to receipt of a multicast packet. In both methods 500 and 600, the packet may include various information, such as, an identification of the node chip(s) to which the packet is to be delivered, which is referred to herein as the "data-list", a fabric-port-mask, a destination-chip-node-mask, a bit mask, a chip mask, etc. A "path index" may also be embedded in the packet, which selects which of a plurality of active down-link ports are to be used to deliver the packet to the destination node chip(s) contained in the identification.

With reference first to FIG. 5, at block 502, a packet is received into a fabric chip 350a from a source fabric chip 350b, for instance, through a first port interface 112a in the first fabric chip 350a. The fabric chip 350a may receive the packet through an up-link port of the source fabric chip 350b. In any event, and as depicted in FIG. 2, the packet may be received into the first port interface 112a through the receipt port 224, into the serdes 222, the DIB 220, the HSL 210, and into a register 206a of the NCR 204a.

At block 504, a determination, in the fabric chip 350a, that a path along which the packet is to be communicated toward a destination node chip identified in the packet is unavailable is made, for instance, by the port resolution module 208. The port resolution module 208 may determine that a path is unavailable, for instance, if a path associated with a selected port interface through which the packet is to be communicated is dead or is otherwise unavailable. The port resolution module 208 may make this determination based upon a prior identification that communication of a packet was not delivered through that port interface 112b-112n. The port resolution module 208 may also make this determination by determining that an attempt to communicate the packet to that port interface 112b-112n has failed. In addition, or alternatively, the port resolution module 208 may determine that a path is unavailable if an acknowledgement message is not received from a destination fabric chip to which an attempt has been made to communicate the packet. In this example, the port interface on the destination fabric chip may be dead or otherwise unavailable or a connection between the port interfaces in the fabric chip 350a and the destination fabric chip 350h may have been severed or is otherwise unavailable.

At block 506, a determination as to which another path toward the destination node chip(s) 311-342 that does not include the source fabric chip 350b is available is made. More particularly, for instance, the port resolution module 208 may determine whether a next alternative port interface 112b-112n from the prioritized list of port interfaces to be used as up-link ports to reach the destination node chip(s) 311-342 is available. If a next alternative port interface 112b-112n is determined to be available, the port resolution module 208 may also determine whether the selected port interface is active, and may determine and select the next port interface 112b-112n in the prioritized list in response to a determination that the selected port interface is unavailable. The port resolution module 208 may continue this process until the port resolution module 208 determines that there are no additional active port interfaces listed in the prioritized list or that only the port interface(s) connected to the source node chip 350b is available.

According to an example, the prioritized list of port interfaces contains the port interface(s) that are in communication with the source fabric chip 350b. In this example, those port interface(s) that are in communication with the source fabric chip 350b, including trunked links, are listed as having the lowest levels of priorities such that the port interface(s) that are in communication with the source node chip 350b are the last choice(s) of port interface(s) to which the packet is communicated.

In response to a determination at block 506 that another path toward the destination node chip(s) 311-342 is available, the packet is communicated along the another path as indicated at block 508. More particularly, for instance, the NCR 204a of the port interface 112a containing the packet may communicate the packet to the determined port interface 112b-112n corresponding to the another path through the unicast data crossbar 124. In addition, the determined port interface 112b-112n may receive the packet from the unicast data crossbar 124 through the NCX 204b. Moreover, the determined port interface 112b-112n outputs the packet.

In response, however, to a determination at block 506 that another path toward the destination node chip(s) 311-342 is unavailable, the packet is communicated back to the source fabric chip 350b as indicated at block 510. More particularly, for instance, the NCR 204a of the port interface 112a containing the packet may communicate the packet back to the source fabric chip 350b through same fabric port through which the packet was received. Alternatively, however, in instances where the fabric chip 350a is connected to the source fabric chip 350b through trunked links 156-158, the port resolution module 208 may determine which of the trunked links 156-158 the packet is to be communicated and the NCR 204a may communicate the packet to the port interface 112b-112n corresponding to the determined trunked link 156-158. The port resolution module 208 may select between the trunked links 156-158 based upon the order in which the trunked links 156-158 are listed in the prioritized list of port interfaces for the source fabric chip 350b.

In any regard, at either of blocks 508 and 510, the packet is communicated to the determined port interface 112b-112n. More particularly, for instance, the NCR 204a of the port interface 112a containing the packet may communicate the packet to the determined port interface 112b-112n through the uni-cast data crossbar 124 or the multi-cast data crossbar 126. In addition, the determined port interface 112b-112n may receive the packet from the unicast data crossbar 124 or the multi-cast data crossbar 126 through the NCX 204b.

At block 512, the method 500 may end for the fabric chip 350a. In addition, the fabric chip(s) 350b-350h that receives the packet from the fabric chip 350a may also perform the operations identified in blocks 502-512.

In response to receipt of the packet back from the fabric chip 350a, the source fabric chip 350b is to select a fabric chip 350c other than the fabric chip 350a to which the packet is to be communicated and to communicate the packet to the other fabric chip 350a. More particularly, for instance, the source fabric chip 350b, and more specifically, a port resolution module 208 of the port interface through which the packet was received, includes a prioritized list of port interfaces that indentifies up-link ports for packets to reach destination node chip(s) 311-342. In addition, the port resolution module 208 may remove the port interface(s) that is in communication with the first fabric chip from the prioritized list of port interfaces prior to selecting the other fabric chip 350c. Moreover, in instances where the source fabric chip 350b comprises at least two port interfaces that are connected to at least two port interfaces of the first fabric chip 350a as trunked links 156-158 of a trunk 154, the at least two port interfaces of the source node chip 350b that are connected to the at least two port interfaces of the first fabric chip 350a are either listed with the lowest level of priority in the prioritized list or removed from the prioritized list. In this regard, the packet may substantially be prevented from bouncing back and forth between the first fabric chip 350a and the source fabric chip 350b.

By way of particular example in which a packet is to be communicated from node chip (N4) 315 to node chip (N23) 334, the node chip (N4) 315 communicates the packet to either port (2) or (3) of the source fabric chip (FC1) 350b.

As discussed above with respect to FIG. 1, the packet from the node chip 315 contains a list of the node chip(s) to which the packet is to be delivered (data-list). In this case, the list includes just the node chip (N23) 334. In addition, the port resolution module 208 of the NCR 204a of the port interface 112a through which the packet was received from the node chip 315 performs a calculation, in hardware, to determine which up-link port(s) (0-11) of the source fabric chip 350b that packet will traverse to reach the destination node chip 334. More particularly, for instance, the packet may include mini-packets (MPackets) that include destination and path information, which the port resolution module 208 may interpret in determining the up-link port(s) (0-11). As discussed above, the packet may comprise a control packet and/or a data packet. A control packet comprises at least one MPacket, whereas, a data packet comprises two or more MPackets.

In any regard, the port resolution module 208 may use this information to index into a look-up table that determines the correct NCI block 202 of the fabric chip 350b to make the next hop to the destination node chip 334. In the above example, the port resolution module 208 may determine that the NCI block 202 of the up-link port (1) is the correct NCI block 202. As such, the NCR 204a of the port interface 112a may communicate the packet to the NCI block 202 of the port interface 112n containing the up-link port (1). The port interface 112n containing the up-link port (1) may communicate the packet to the first fabric chip (FC1) 350a connected to up-link port (1).

The first fabric chip (FC1) 350a may receive the packet through up-link port (0) and the NCR 204a of the port interface 112a containing that up-link port (0) may use the information contained in the packet to determine the correct NCI block 202 of the first fabric chip 350a the packet is to be delivered to make the next hop to the destination node chip 334. In this example, the port resolution module 208 may determine that the NCI block 202 of the up-link port (1) is the correct NCI block 202. However, the port resolution module 208 may determine that the path along the up-link port (1) is unavailable.

In a first example shown with respect to FIG. 4A, the port resolution module 208 may determine that another path that does not include the source fabric chip (FC1) 350b is unavailable. That is, in FIG. 4A, there is only one connection between the first fabric chip 350a and the another fabric chip 350h and only one connection between the first fabric chip 350a and the source fabric chip 350b. As such, if the connection between the first fabric chip 350a and the another fabric chip 350h is unavailable, there is only one remaining path, which is back to the source fabric chip 350b. The first fabric chip (FC0) 350a may thus communicate the packet back to the source fabric chip (FC1) 350b. In addition, the source fabric chip (FC1) 350b may select the next port interface through which the packet is to be delivered to another fabric chip (FC2) 350c and may communicate the packet to that another fabric chip (FC2) 350c. Moreover, the packet may be propagated through the remaining fabric chips 350d-350f until the packet reaches the destination node chip 334.

In a second example shown with respect to FIG. 4B, the port resolution module 208 may determine that the trunked link 158 between port (11) of the first fabric chip (FC0) 350a and port (10) of the another fabric chip (FC7) 350h is another path along which the packet may be communicated toward the destination node chip 334. In this example, the port resolution module 208 may determine whether the path along the trunked link 158 is available and if so, may communicate the packet along that path. If, however, it is determined that that path is unavailable and that any other possible paths are unavailable, the port resolution module 208 may communicate the packet back to the source fabric chip 350b over one of the trunked links between the first fabric chip 350a and the source fabric chip 350b. The source fabric chip 350b may receive the packet back from the first fabric chip 350a and may remove the port interfaces that are linked to the first fabric chip 350c from the prioritized list of port interfaces. In addition, the source fabric chip 350b may select and communicate the packet to the second fabric chip (FC2), which may then communicate the packet toward the destination node chip 334.

With reference now to FIG. 6, at block 602, a multicast packet is received into a fabric chip 350a from the source fabric chip 350b. In either event, and as depicted in FIG. 2, the packet may be received through the receipt port 224, into the serdes 222, the HSL 210, and into a register 206a of the NCR 204a.

At block 604, a list of the port interfaces 112a-112n that are usable is calculated. In other words, a list of the port interfaces 112a-112n that are not bad U-turns and are not unavailable is calculated. According to an example, the port resolution module 208 may calculate the list of usable port interfaces 112a-112n based upon, for instance, an identification of available paths in the switch fabric 300, 400, 410, an identification of port interface through which the packet was received, etc.

At block 606, the list of usable port interfaces 112a-112n is communicated along with the packet to a port interface that is to receive the packet. In other words, the port resolution module 208 may determine from information contained in the packet, which of the usable port interfaces 112a-112n are to receive the packet and may communicate the packet with the list of usable port interfaces 112a-112n to the determined port interfaces 112a-112n transmitting as few copies of the packet as necessary, over the multicast data crossbar 126.

At block 608, a destination list of the packet is pruned by the port interfaces that received the packet using the list of the usable port interfaces. The port resolution operation's calculations are reconstructed on the plural NCXs' 204b sides of the multicast crossbar 126, to determine which destination nodes would have ended up at the registers 206d of this particular NCX 204b. This allows the pruning logic to remove all destination nodes that would NOT have mapped to this particular NCX 204b from this particular NCX's 204b list of the registers 206c of the destination nodes 204b. This behavior exists in each of the NCXs 204b that received a copy of the multicast packet, as each NCX 204b is to only propagate the multicast packet to the destination nodes that map to this NCX 204b, in the NCR's 204a port resolution operation.

At bock 610, the multicast packet is delivered to at least one second fabric chip according to the pruned destination list of the packet. The number of multicast packets that are delivered is equal to the number of NCXs 204b that received copies of the packet as discussed in the above paragraph.

In one regard, because the fabric chips 350a-350h control delivery and forwarding of the packets to the node chips 311-342, the multi-cast packet need be sent by a node chip 311 once, instead of individually to each of the destination nodes. This reduces the amount of bandwidth consumed in the switch fabrics 300, 400, and 410 in delivering the packet to the destination node chips 311-342.

In addition, the fabric chip 350b that receives the multicast packet from the fabric chip 350a, and/or another fabric chip 350c-350h positioned further downstream from the fabric chip 350b, is to replicate the multi-cast packet for communication to the destination node chips of the multi-cast packet. In this regard, instead of communicating multiple copies of the multi-cast packet over the links between the fabric chips 350a-350h, a single-copy-per-trunk of the multi-cast packet may be communicated over the links and the fabric chips 350a-350h located the farthest away from the source fabric chips 350a-350h may replicate the multi-cast packets. This reduces the amount of bandwidth consumed in the switch fabric 300, 400 in delivering the multi-cast packet to the destination node chips 311-342. Moreover, as the multi-cast packets are delivered to the destination chip nodes, the NCXs 204b in the fabric chips 350a-350c may remove the chip nodes that received the multi-cast packet from the identification of node chip(s) to thereby reduce or eliminate duplicate delivery attempts of the multi-cast packet.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A method for implementing a switch fabric, said method comprising:
   in a first fabric chip,
      receiving a packet from a source fabric chip, wherein the packet comprises an identification of a destination node chip;
      determining that a first path in the switch fabric along which the packet is to be communicated toward the destination node chip is unavailable;
      determining whether another path for communicating the packet in the switch fabric toward the destination node chip that does not include the source fabric chip is available;
      communicating the packet along the another path in response to a determination that the another path is available; and
      communicating the packet back to the source fabric chip in response to a determination that the another path is unavailable;
   in the source fabric chip, wherein the source fabric chip comprises a prioritized list of port interfaces that identifies up-link ports for packets to reach destination node chips,
      receiving the packet back from the first fabric chip;
      selecting a fabric chip other than the first fabric chip to which the packet is to be communicated;
      communicating the packet to the other fabric chip; and
      removing the port interface that is in communication with the first fabric chip from the prioritized list of port interfaces prior to selecting the fabric chip other than the first fabric chip.

2. The method according to claim 1, wherein the source fabric chip comprises at least two port interfaces that are connected to at least two port interfaces of the first fabric chip as trunked links of a trunk, and wherein the at least two port interfaces of the source fabric chip that are connected to the at least two port interfaces of the first fabric chip are either listed with the lowest level of priority in the prioritized list or removed from the prioritized list following receipt of the packet back from the first fabric chip.

3. The method according to claim 1, said first fabric chip comprising a plurality of port interfaces, wherein each of the plurality of port interfaces is programmed with a respective list of correlations between the plurality of port interfaces and a plurality of destination nodes, said method further comprising:
   identifying a destination fabric chip to receive the packet from an identification of the destination fabric chip contained in the packet; and
   determining which port interface of the plurality of port interfaces is to receive the packet based upon a correlation between the identification of the destination node chip in the respective list of correlations;
   attempting to communicate the packet to the destination fabric chip through the determined port interface; and
   wherein determining that the first path along which the packet is to be communicated toward the destination node is unavailable further comprises determining that the first path along which the packet is to be communicated toward the destination node is unavailable in response to a determination that the packet has not been communicated to the destination fabric chip.

4. The method according to claim 3, wherein the first fabric chip is to receive the packet through a first port interface of the plurality of port interfaces, wherein the first port interface is programmed with a list of correlations between the plurality of port interfaces and a plurality of destination nodes, and wherein determining which port interface of the plurality of port interfaces is to receive the packet further comprises determining which port interface is to receive the packet by comparing information contained in the packet and the list of correlations.

5. The method according to claim 4, wherein the first port interface is programmed with a prioritized list of port interfaces that identifies up-link ports for the packets to reach destination node chips, and wherein the port interface that is in communication with the source node chip is listed with the lowest level of priority in the prioritized list, said method further comprising:
   attempting to communicate the packet through each of the port interfaces in an order according to their priorities as listed in the prioritized list of port interfaces such that the port interface that is in communication with the source node chip is the last choice of port interface to which the packet is communicated.

6. The method according to claim 4, wherein at least two of the plurality of port interfaces are connected to at least two port interfaces of the source fabric chip as trunked links of a trunk, wherein the first port interface is programmed with a prioritized list of port interfaces that identifies up-link ports for the packets to reach destination node chips, and wherein the at least two port interfaces of the first fabric chip that are connected to the at least two port interfaces of the source fabric chip are listed with the lowest level of priority in the prioritized list, said method further comprising:
   attempting to communicate the packet through each of the port interfaces in an order according to their priorities as listed in the prioritized list of port interfaces such that the at least two port interfaces that are in communication with the at least two port interfaces of the source node chip are the last choice of port interfaces to which the packet is communicated.

7. The method according to claim 3, wherein the packet comprises a multicast packet, said method further comprising:

calculating a list of the port interfaces that are useable;

communicating the list of the useable port interfaces along with the packet to the determined port interface that is to receive the packet;

pruning, at the determined port interface, a destination list of the packet using the list of the useable port interfaces; and delivering the multicast packet to at least one second fabric chip according to the pruned destination list of the packet.

8. A switch fabric comprising:

a destination node chip;

a first fabric chip to receive a packet from a source fabric chip, wherein the packet comprises an identification of the destination node chip, said first fabric chip comprises a port resolution module that is to:
  determine that a first path in the switch fabric along which the packet is to be communicated toward the destination node chip is unavailable;
  determine whether another path in the switch fabric along which the packet is to be communicated toward the destination node chip that does not include the source fabric chip is available;
  communicate the packet along the another path in response to a determination that the another path is available; and
  communicate the packet back to the source fabric chip in response to a determination that the another path is unavailable and the source fabric chip comprising a prioritized list of port interfaces that identifies up-link ports for packets to reach destination node chips and a source port resolution module that is to:
  receive the packet back from the first fabric chip;
  select a fabric chip other than the first fabric chip to which the packet is to be communicated;
  communicate the packet to the other fabric chip; and
  remove the port interface that is in communication with the first fabric chip from the prioritized list of port interfaces prior to selecting the fabric chip other than the first fabric chip.

9. The switch fabric according to claim 8, wherein the source fabric chip comprises at least two port interfaces that are connected to at least two port interfaces of the first fabric chip as trunked links of a trunk, and wherein the at least two port interfaces of the source fabric chip that are connected to the at least two port interfaces of the first fabric chip are either listed with the lowest level of priority in the prioritized list or removed from the prioritized list following receipt of the packet back from the first fabric chip.

10. A fabric chip comprising:

a plurality of port interfaces, wherein each of the plurality of port interfaces programmed with a respective list of correlations between the plurality of port interfaces and includes a network chip interface (NCI) block having a port resolution module;

a crossbar block communicatively coupled with each of the NCI blocks in the plurality of port interfaces;

wherein the fabric chip is to receive a packet from a source fabric chip through one of the plurality of port interfaces, wherein the packet comprises an identification of a destination node chip, and wherein the port resolution module of the one of the plurality of port interfaces is to:
  determine which of the plurality of port interfaces is to receive the packet from the NCI block;
  determine that a first path in a switch fabric along which the packet is to be communicated toward the destination node chip is unavailable;
  determine whether another path in the switch fabric along which the packet is to be communicated toward the destination node chip that does not include the source fabric chip is available;
  communicate the packet along the another path in response to a determination that the another path is available;
  communicate the packet back to the source fabric chip in response to a determination that the another path is unavailable;
  identify a destination fabric chip to receive the packet from an identification of the destination fabric chip contained in the packet;
  determine which port interface of the plurality of port interfaces is to receive the packet based upon a correlation between the identification of the destination node chip in the respective list of correlations;
  attempt to communicate the packet to the destination fabric chip through the determined port interface; and
  determine that the first path along which the packet is to be communicated toward the destination node is unavailable in response to a determination that the packet has not been communicated to the destination fabric chip.

* * * * *